United States Patent
Kumar

(10) Patent No.: US 8,373,301 B2
(45) Date of Patent: Feb. 12, 2013

(54) SYSTEM AND METHOD FOR PROVIDING POWER TO TWO LOADS FROM A SINGLE THREE-PHASE INVERTER

(75) Inventor: Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 598 days.

(21) Appl. No.: 12/573,948

(22) Filed: Oct. 6, 2009

(65) Prior Publication Data

US 2011/0080042 A1    Apr. 7, 2011

(51) Int. Cl.
*H02J 3/00* (2006.01)
(52) U.S. Cl. .......................................... 307/13
(58) Field of Classification Search ....................... 307/13
See application file for complete search history.

(56) References Cited

U.S. PATENT DOCUMENTS

| 4,143,414 A | 3/1979 | Brewster et al. |
| 4,384,321 A | 5/1983 | Rippel |
| 4,680,689 A | 7/1987 | Payne et al. |
| 5,218,283 A | 6/1993 | Wills et al. |
| 5,311,419 A | 5/1994 | Shires |
| 5,321,600 A | 6/1994 | Fierheller |
| 5,731,969 A | 3/1998 | Small |
| 7,579,714 B2 * | 8/2009 | Okui ............................. 307/64 |
| 2010/0161198 A1 * | 6/2010 | Kuwahara et al. ............ 701/102 |

FOREIGN PATENT DOCUMENTS

JP    2004343863 A  * 12/2004

* cited by examiner

*Primary Examiner* — Rexford Barnie
*Assistant Examiner* — Dru Parries
(74) *Attorney, Agent, or Firm* — GE Global Patent Operation; John A. Kramer

(57) ABSTRACT

A method for providing electrical power to two loads on a powered system/unit, the method including supplying electrical power from a first phase and a second phase of a three-phase inverter to a first load, supplying electrical power from the second phase and a third phase of a three-phase inverter to a second load, and independently controlling the first phase and the third phase of the electrical power to comply with an electrical requirement of the first load and/or the second load. The two loads may be DC loads that require DC power for operation, or the loads may be AC loads that require two-phase power for operation. A system for providing electrical power to two loads on a powered unit is also disclosed.

22 Claims, 7 Drawing Sheets

Prior Art vs.

SYSTEM AND METHOD FOR PROVIDING POWER TO TWO LOADS FROM A SINGLE THREE-PHASE INVERTER

BACKGROUND OF THE INVENTION

Embodiments of the invention relate to a powered system or unit, such as a locomotive, an off-highway vehicle, a marine vessel, and/or a transportation vehicle. Other embodiments relate to a system and method for supplying electrical power to loads in such a powered system.

Powered systems or units such as locomotives use traction motor inverters and auxiliary inverters to supply power and control auxiliary loads, such as, but not limited to, radiator fans, compressors, blowers, and the like. The inverters are three-phase inverters that provide a balanced three-phase output of electrical power. Currently, an individual three-phase inverter is used to provide power for an individual direct current (DC) load. Therefore, if there are two DC loads, two three-phase inverters are required. In addition to a three-phase inverter, other parts are required for each DC load, such as transformers, rectifiers, and/or DC/DC converters.

Owners and operators of powered systems that require power to be provided to both AC loads and DC loads using power inverters would benefit from a system that requires fewer parts, or an ability to use three-phase inverters in their current form to supply power to dual DC loads and provide independent control of power to each of these loads.

BRIEF DESCRIPTION OF THE INVENTION

Embodiments of the present invention relate to a method and system for providing power from a three-phase inverter to two loads in a powered system/unit. In one embodiment, the method comprises supplying first electrical power from a first phase and a second phase of a three-phase inverter to a first load, and supplying second electrical power from the second phase and a third phase of the three-phase inverter to a second load. The method further comprises independently controlling the first phase and the third phase of the three-phase inverter to comply with one or more electrical requirements of the first load and/or the second load.

In another embodiment, a method for providing electrical power to loads in a powered system/unit comprises converting electrical power of a first phase and a second phase of a three-phase inverter to a first DC signal. The first DC signal is supplied to a first true DC load requiring the first DC signal for operation. (A "true" DC load is a load that requires a DC signal for operation.) The method further comprises converting electrical power of a third phase and the second phase of the three-phase inverter to a second DC signal. The second DC signal is supplied to a second true DC load requiring the second DC signal for operation. The method further comprises independently controlling the first phase and the third phase of the three-phase inverter to comply with one or more electrical requirements of the first true DC load and/or the second true DC load.

In one embodiment, the system comprises a three-phase inverter configured to supply first electrical power from a first phase and a second phase of the three-phase inverter to a first load and second electrical power from the second phase and a third phase of the three-phase inverter to a second load. The system further comprises a controller configured to control the first phase and the third phase of the three-phase inverter to comply with one or more electrical requirements of the first load and/or the second load.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, exemplary embodiments of the invention will be described and explained with additional specificity and detail through the use of the accompanying drawings in which.

DETAILED DESCRIPTION OF THE INVENTION

Figure 1:
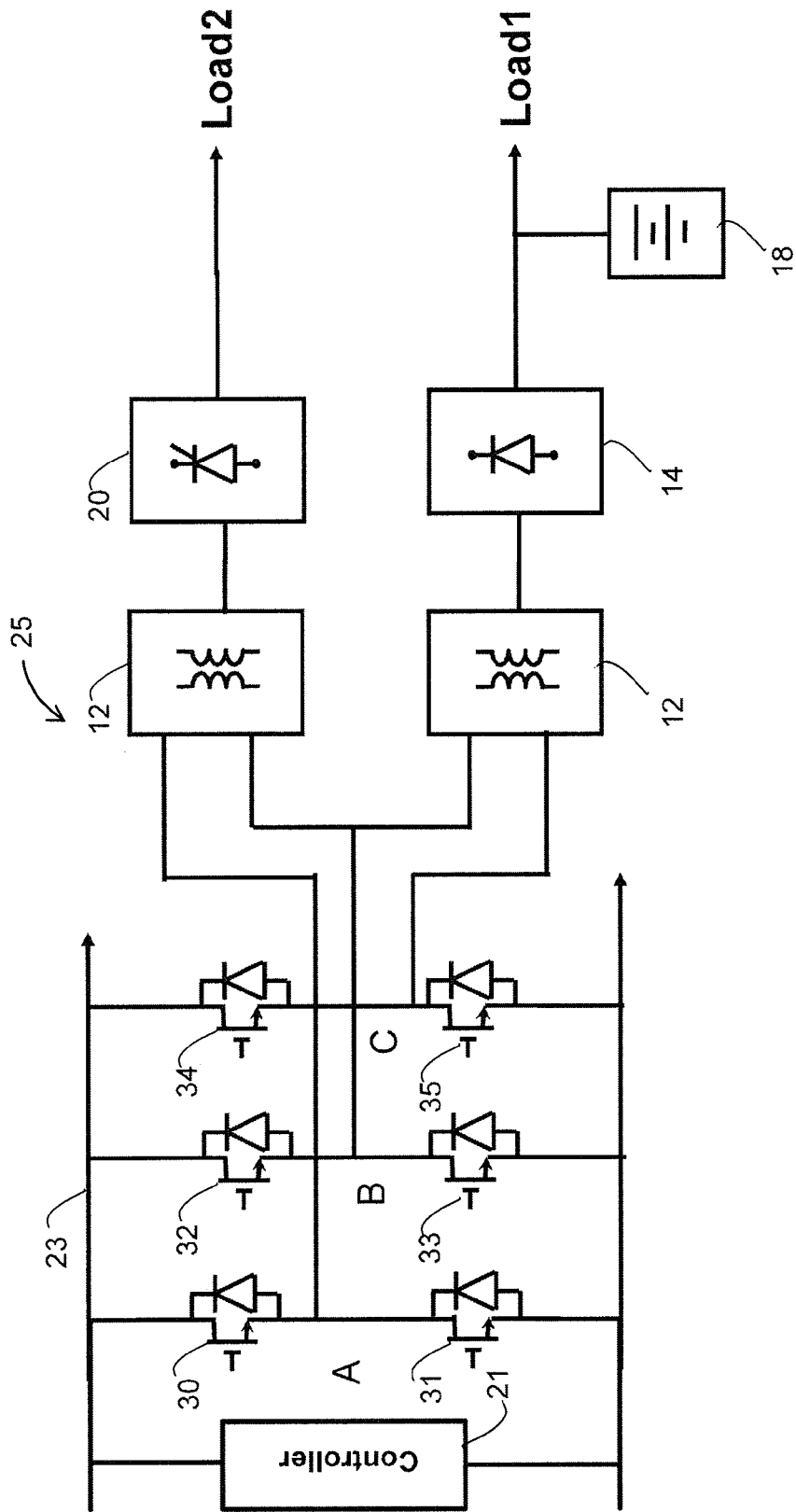
FIG. 1 depicts an illustration of a system for providing power to two loads with a three-phase inverter, according to an embodiment of the present invention.

Reference will be made below in detail to exemplary embodiments of the invention, examples of which are illustrated in the accompanying drawings. Wherever possible, the same reference numerals used throughout the drawings refer to the same or like parts.

Though exemplary embodiments of the present invention are described with respect to rail vehicles, or railway transportation systems, specifically locomotives, exemplary embodiments of the invention are also applicable for use with other powered systems or powered units, such as, but not limited to, off-highway vehicles, agricultural vehicles, marine vehicles, and/or transportation vehicles, each which may use at least one engine and has power inverters. Currently on a typical locomotive, many three-phase inverters, of the same kind/part, are used to drive other loads such as, but not limited to, radiator fans, blowers, compressors, etc., where these three-phase inverters provide for a balanced three-phase output. In many locomotives, there may be only two DC loads, namely, a battery and an alternator exciter (or field controllers), where each load is provided with its own three-phase inverter. However, other DC loads may be available on other powered systems.

Referring now to the drawings, embodiments of the present invention will be described. Exemplary embodiments of the invention can be implemented in numerous ways, including as a system, an apparatus, and/or as a method. Several embodiments of the invention are discussed below.

FIG. 1 depicts an illustration of a system 25 for providing power to multiple loads with a three-phase inverter 23. The three-phase inverter 23 provides three phases of electrical power within the system 25. As illustrated, electrical power from a first phase of the three-phase inverter 23, phase A, and electrical power from a second phase of the three-phase inverter, phase B, are provided to a first DC load, Load 1. Electrical power from the second phase, phase B, and a third phase, phase C, are provided to a second DC load, Load 2. Though the term "DC load" is used herein, such a term is not limiting. Unless otherwise specified, "DC load" is meant to include any load that requires less than three phases of power, such as only two phases of power. Therefore, a DC load may also include an AC load that requires only two phases of power. In any of the embodiments described herein, the DC loads may include one or more of the following: an AC load that requires two-phase power, an AC load that requires one-phase power, AC/DC loads (meaning loads capable of operating on one- or two-phase AC power or DC power), and true DC loads (meaning a load that requires DC power). In one embodiment, the DC loads comprise solely loads that require two-phase AC power. In another embodiment, the DC loads comprise solely true DC loads. In another embodiment, the DC loads include at least one first load that requires two-phase AC power and at least one second load each of which is a true DC load.

Between the inverter 23 and each load (Load 1 and Load 2) is a transformer 12, if isolation is required. For one of the loads, Load 1, a rectifier 14 is provided between the transformer 12 and the load, while in the case of the second load, Load 2, a phase-controlled rectifier 20 is operably coupled between Load 2 and the transformer 12. Though a phase-controlled rectifier is illustrated, such a variable rectifier is not needed if a direction of power flow is from the inverter 23 to the load, Load 2. However, if the direction of power flow needs to be reversed, the variable/phase-controlled rectifier 20 may be included and used to reverse the power flow. A battery 18 may also be included in the system 25.

Using the embodiment disclosed in FIG. 1, two phases of power may be controlled when providing power to the respective loads. As illustrated, six switches 31, 32, 33, 34, 35, 36 are provided where two switches provide for phase A, 31, 32, two other switches provide for phase B, 33, 34, and two other switches provide for phase C, 34, 36. (As should be appreciated, the switches are part of the inverter 23. Additionally, although these elements are characterized as "switches," this is merely in regards to function, and the switches may be solid-state electrical circuits configured for carrying out a switching operation based on an input control signal. For example, each switch may include a power transistor and diode circuit, as illustrated in FIG. 1, with the circuit being controlled through application of a signal, such as shown in FIGS. 2-6, to the gate of the transistor.) Within each pair of switches, one switch provides a positive output while the other switch provides a negative output. For example, for phase A, the first switch 31 provides for A+ while the second switch 32 provides for A−. For phase B, one switch 33 provides for B+ while the other switch 34 provides for B−. For phase C, one switch 35 provides for C+ and the other switch provides for C−. The firing sequence of the switches determines the voltage output.

In a conventional three-phase inverter, the firing of the switches A+, A−, B+, B−, C+, C− is done in such a way that the phases are symmetrically controlled. For example, phase B lags phase A by 120 degrees and phase C lags phase A by 240 degrees, or phase C lags phase B by 120 degrees. Unlike the conventional implementation, in an exemplary embodiment of the present invention, a plurality of control options, or firing schemes, is possible where prior art symmetrical control is not utilized.

Figure 2:
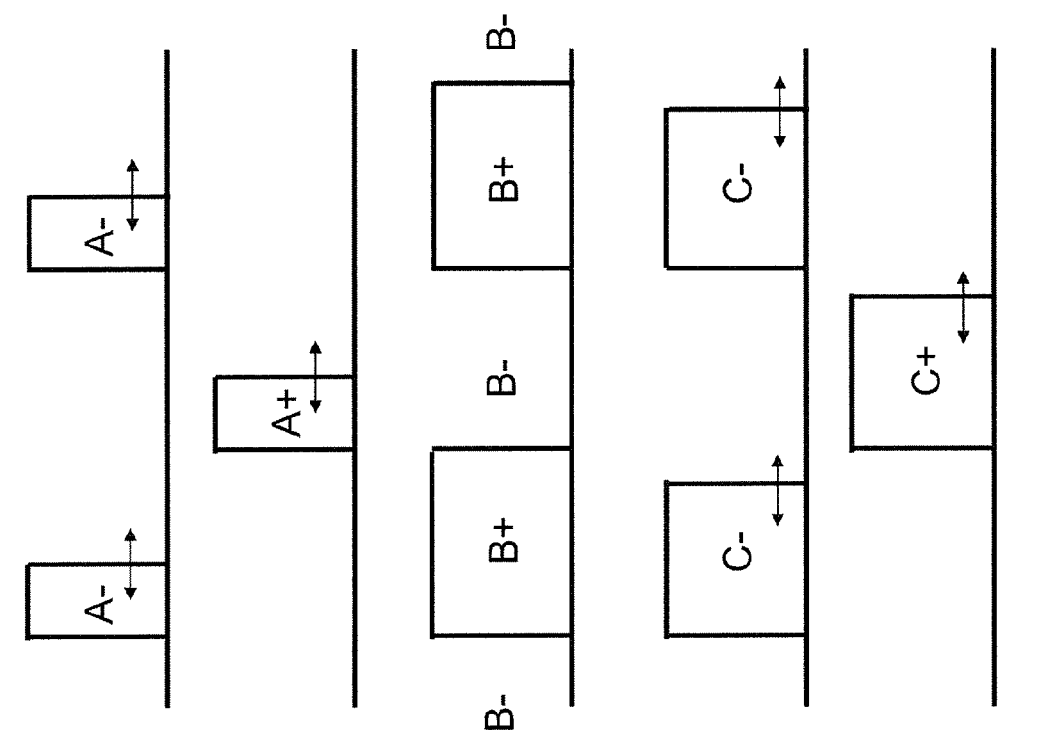
FIG. 2 depicts an exemplary control scheme for converting three-phase electrical power for supply to two DC loads.

FIG. 2 depicts an exemplary control scheme, or option. As illustrated, either B+ or B− of phase B is on fifty percent of the time. (In the example illustrated in FIG. 2, B+ is on fifty percent of the time.) A+ and A− of phase A are on a fraction of the time, and so is C+ and C− of phase C, though phase C and phase B may be on at a different time when compared to the A phase. Therefore, the difference across phases AB, after rectification, is the voltage across Load 2 whereas the difference across phases BC, after rectification, is the voltage across Load 1. By controlling phase A and phase C, independent control of the power to each load is realized. The leading edge or trailing edge of phase A and phase C may be controlled, which results in two degrees of freedom.

Figure 3:
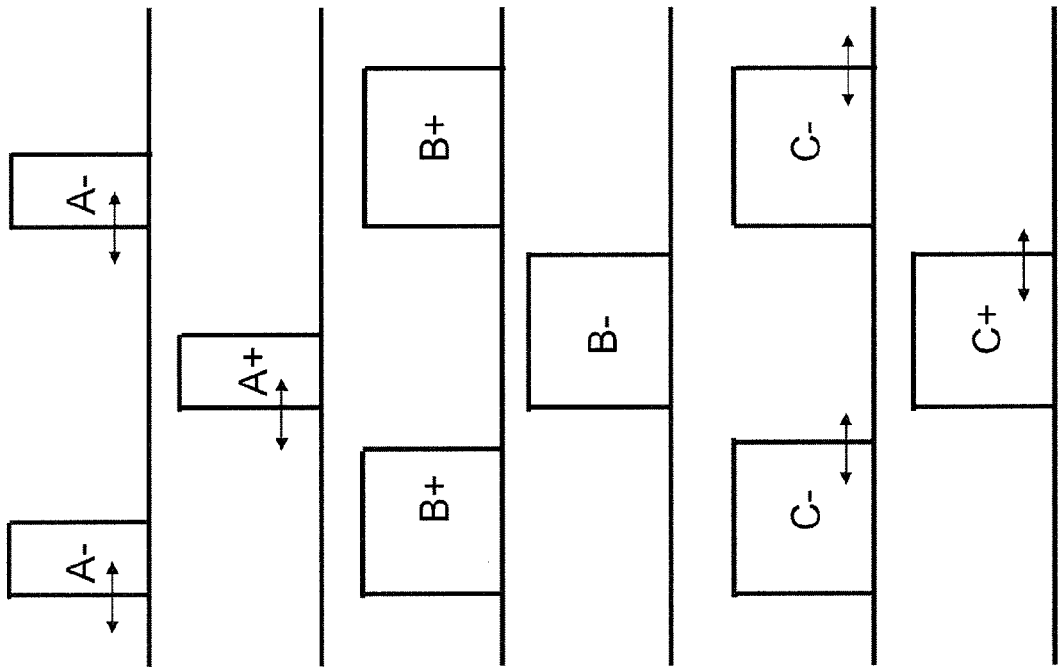
FIG. 3 depicts another exemplary control scheme for converting three-phase electrical power for supply to two DC loads.

FIG. 3 depicts another exemplary control scheme, or option, where the leading edge of phase A is controlled while the trailing edge of phase C is controlled. In this case, phase B is not on fifty percent of the time. Instead, phase B is on a maximum of what is needed for phase A or phase C. In other words, phase A is positioned at one end of phase B, and phase C is positioned at the other end of phase B, and both are adjusted according to phase B.

Figure 4:
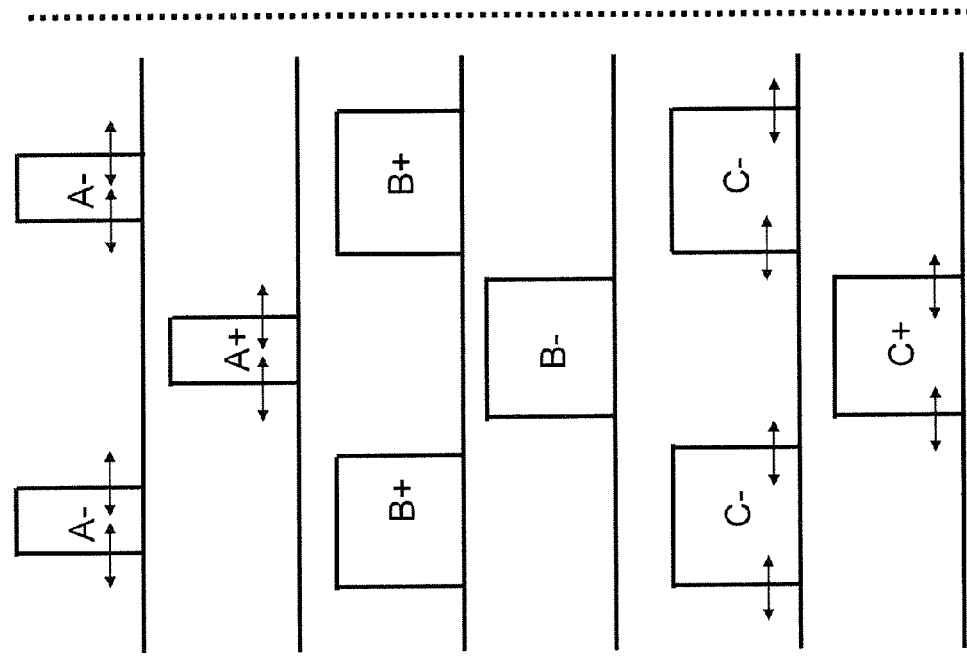
FIG. 4 depicts another exemplary control scheme for converting three-phase electrical power for supply to two DC loads.

FIG. 4 depicts another exemplary control scheme, or option, where both edges of phase A and phase C are controlled so that both of these phases are centered about phase B. Therefore phase B is on for a maximum duration of phase A or phase C.

Figure 5:
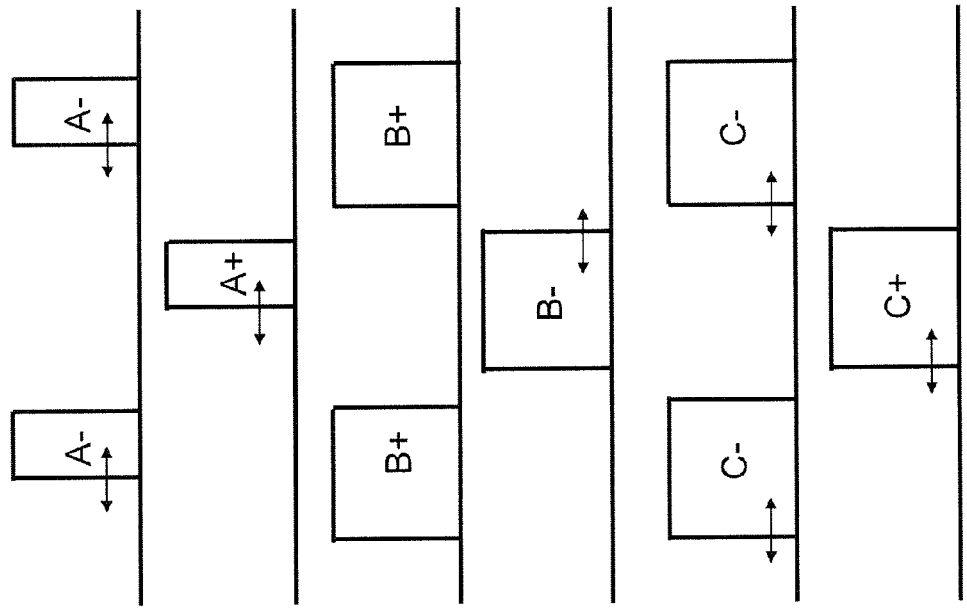
FIG. 5 depicts another exemplary control scheme for converting three-phase electrical power for supply to two DC loads.

FIG. 5 further depicts that an edge of phase B may also be controlled. In this case, both phase A and phase C are positioned to one edge of phase B (trailing edge is illustrated), and the width of phase B is set to the maximum width of phase A and phase C.

Figure 6:
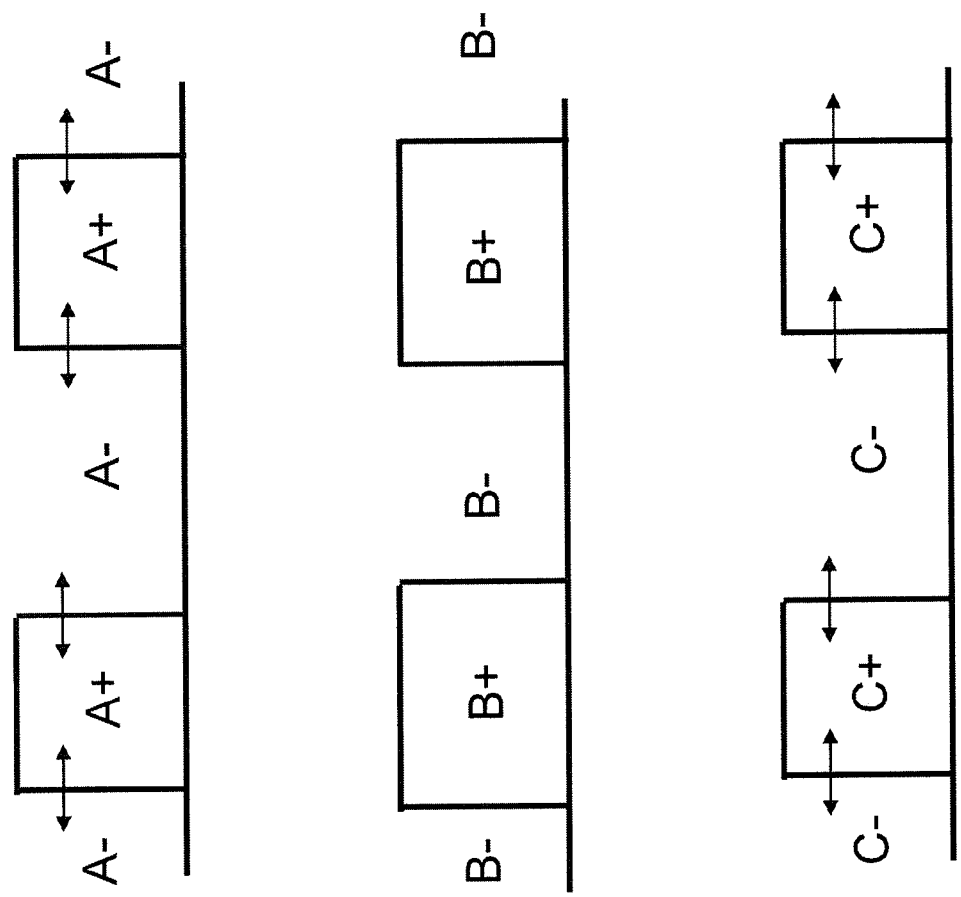
FIG. 6 depicts another exemplary control scheme for converting three-phase electrical power for supply to two DC loads.

FIG. 6 depicts another exemplary control scheme, or option, having each phase in an ON position where phase shifting (phase A leading phase B and phase C leading phase B) results in different voltages for the two loads, where each phase shift is independent of the other. In this case, the 180 degrees firing is used for all phases, but the phase shift provides the voltage control. Those skilled in the art will recognize that many variations and combinations of these are also possible.

Figure 7:
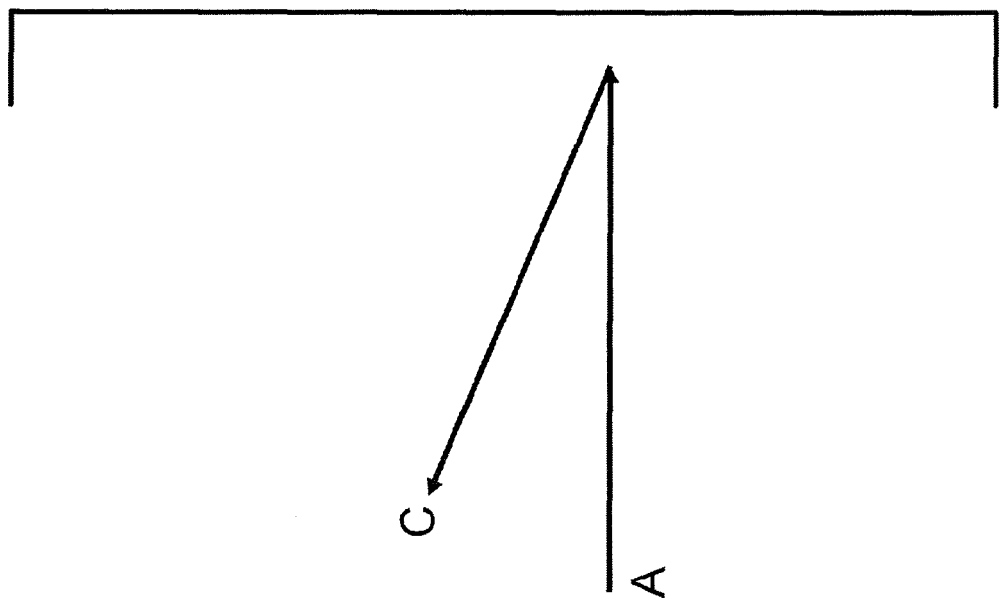
FIG. 7 depicts two vector diagrams illustrating a comparison between a prior art control scheme and an exemplary embodiment of a control scheme.
Figure 7:
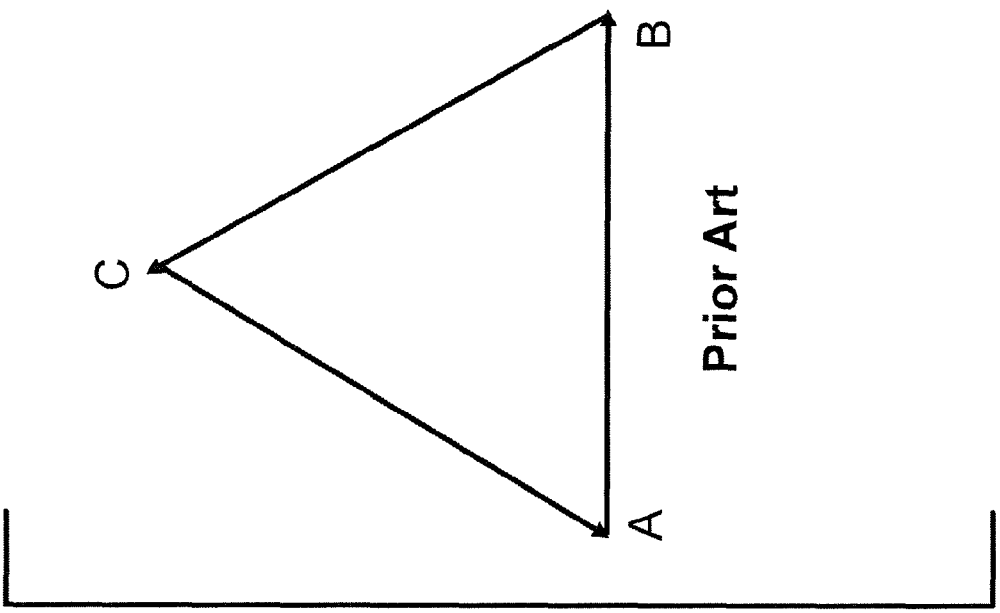

Any of the control schemes or options described herein may be implemented using a controller and associated support circuitry 21 operably coupled to the three-phase inverter 23. For example, the controller and/or associated support circuitry 21 may be coupled to the control input of switches 31, 32, 33, 34, 35, 36, for activating the switches according to the schemes (timing diagrams) illustrated in any of FIGS. 2-6 or otherwise. FIG. 7 depicts a comparison between a prior art control scheme, discussed above, and an exemplary embodiment of a control scheme, disclosed herein, using vector diagrams. Normally, three-phase power may be represented in a vector diagram where each vector, AB, BC, and CA is each 120 degrees apart. Using the system disclosed in FIG. 1, the phases are no longer 120 degrees apart. The system has control over vectors AB and BC, but not CA. But since power is only being provided to two loads, only two vectors are required to be controlled.

Figure 8:
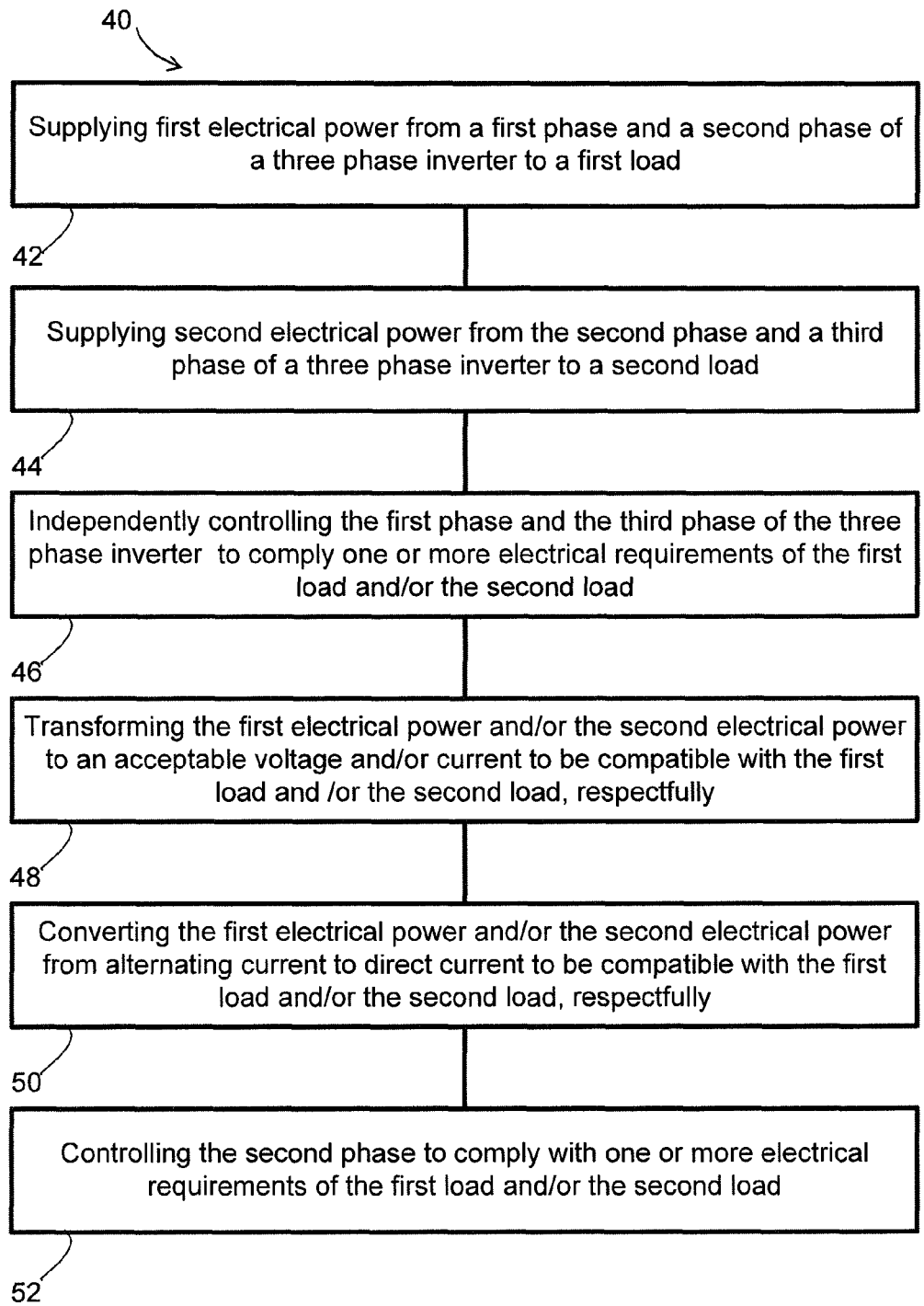
FIG. 8 depicts a flowchart illustrating an exemplary method for providing electrical power to two loads.

FIG. 8 depicts a flowchart illustrating an exemplary method for providing electrical power to two loads. The method illustrated in the flowchart 40 comprises supplying electrical power from a first phase and a second phase of a three-phase inverter to a first load, at 42. The method also provides for supplying electrical power from the second phase and a third phase of a three-phase inverter to a second load, at 44. The first phase and the third phase of the electrical power is independently controlled to comply with one or more electrical requirements of the first load and/or the second load, at 46. Examples of possible electrical requirements include a voltage level (including minimum and maximum voltage levels), a current level (including minimum and maximum current levels), and/or voltage/current signal waveforms. As disclosed above, in one embodiment, independently controlling the first phase and the third phase comprises determining whether to control a leading edge and/or a trailing edge of the first phase and/or the third phase.

The electrical power is transformed to an acceptable voltage and/or current for the first load and/or the second load, at 48, meaning the voltage and/or current are compatible with the first load and/or the second load. As disclosed above, the electrical power may be converted from alternating current to direct current to be compatible with the first load and/or the second load, at 50 (e.g., using transformers, rectifiers, and/or the like). Also, as disclosed previously, the second phase may be controlled to comply with an electrical requirement of the first load and/or the second load, at 52.

Figure 9:
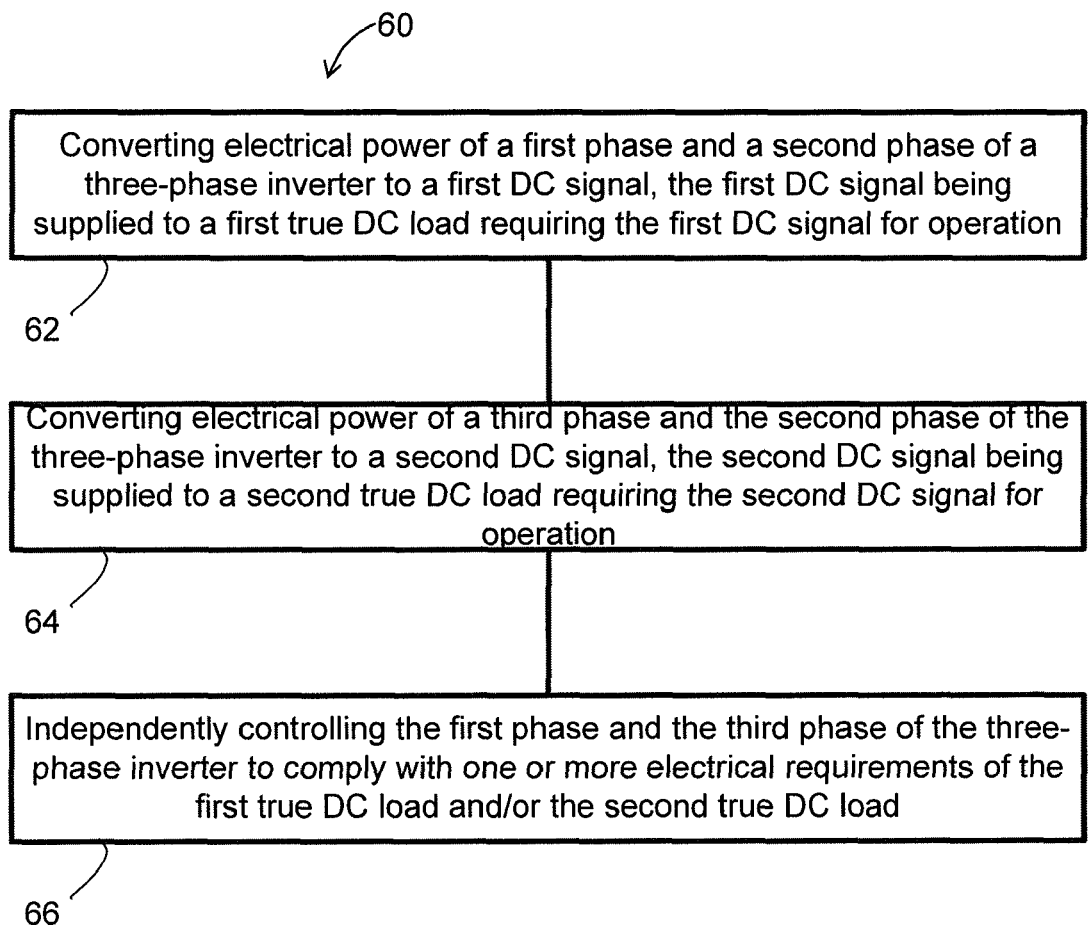
FIG. 9 depicts another flowchart illustrating an exemplary method for providing electrical power to two loads in a powered system/unit.

In another embodiment, illustrated in FIG. 9, a method for providing electrical power to loads in a powered system/unit comprises converting electrical power of a first phase A and a second phase B of a three-phase inverter 23 to a first DC signal, at 62. The first DC signal is supplied to a first true DC load (e.g., Load 1) requiring the first DC signal for operation. The method further comprises converting electrical power of a third phase C and the second phase B of the three-phase inverter 23 to a second DC signal, at 64. The second DC signal is supplied to a second true DC load (e.g., Load 2) requiring the second DC signal for operation. The method further comprises independently controlling the first phase A and the third phase C of the three-phase inverter 23 to comply with one or more electrical requirements of the first true DC load and/or the second true DC load, at 66. The first and second phase signals, and second and third phase signals, may be converted into the first and second DC signals, respectively, using a respective transformer 12 and/or rectifier 14 (e.g., there may be a first transformer and/or a first rectifier for conversion of the electrical power of the first and second phases to the first DC signal, and a second transformer and/or a second rectifier for conversion of the electrical power of the second and third phases to the second DC signal). As disclosed above, the method may be illustrated as a flowchart 60.

In any of the embodiments described herein, the first electrical power (i.e., the power signal supplied to the first load from the first and second phases of the inverter) may be a first DC signal produced from the first phase and second phase, and with the first load being a first true DC load requiring the first DC signal for operation. The second electrical power (i.e., the power signal supplied to the second load from the second and third phases of the inverter) may be a second DC signal produced from the second phase and the third phase, and with the second load being a second true DC load requiring the second DC signal for operation.

In any of the embodiments described herein, the first electrical power (supplied to the first load from the first and second phases of the inverter) may be a two-phase AC signal, with the first load being an AC load that requires the two-phase AC signal for operation. The second electrical power (supplied to the second load from the second and third phases of the inverter) may be a DC signal produced from the second and third phase, with the second load being a true DC load that requires the DC signal for operation.

In any of the embodiments described herein, the first electrical power (supplied to the first load from the first and second phases of the inverter) may be a first two-phase AC signal, with the first load being a first AC load that requires the first two-phase AC signal for operation. The second electrical power (supplied to the second load from the second and third phases of the inverter) may be a second two-phase AC signal, with the second load being a second AC load that requires the second two-phase AC signal for operation.

As should be appreciated, the term "phase" refers to an AC signal. For two or more phases, the phases are offset in time from one another. For example, the three-phase output of the three-phase inverter 23 will typically comprise three AC power signals having generally the same waveform and amplitude but each spaced apart from one another by 120 degrees.

While the invention has been described with reference to various exemplary embodiments, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated, any use of the terms first, second, etc., do not denote any order or importance, but rather the terms first, second, etc., are used to distinguish one element from another.

What is claimed is:

1. A method comprising:
   supplying first electrical power from a first phase and a second phase of output from a three-phase inverter to a first load of a vehicle;
   supplying second electrical power from the second phase and a third phase of the output from the three-phase inverter to a separate and distinct second load of the vehicle; and
   independently controlling the first phase and the third phase of output from the three-phase inverter to comply with one or more electrical requirements of at least one of the first load or the second load.

2. The method according to claim 1, further comprising transforming at least one of the first electrical power or the second electrical power to one or more of a designated voltage or a designated current to power one or more of the first load or the second load.

3. The method according to claim 1, further comprising converting at least one of the first electrical power or the second electrical power from alternating current to direct current for powering at least one of the first load or the second load.

4. The method according to claim 1, wherein independently controlling the first phase and the third phase further comprises determining whether to control one or more of a leading edge or a trailing edge of at least one of the first phase or the third phase.

5. The method according to claim 1, further comprising controlling the second phase to comply with the one or more electrical requirements of at least one of the first load or the second load.

6. The method according to claim 1, wherein the first electrical power is a first direct current (DC) signal produced from the first phase and the second phase, the first load includes a first true DC load requiring the first DC signal for operation of the first load, and wherein the second electrical power is a second DC signal produced from the second phase and the third phase, the second load including a second true DC load requiring the second DC signal for operation of the second load.

7. The method according to claim 1, wherein the first electrical power is a two-phase alternating current (AC) signal and the first load includes an AC load requiring the two-phase AC signal for operation of the first load, and wherein the second electrical power is a direct current (DC) signal and the second load includes a true DC load requiring the DC signal for operation of the second load, the DC signal being produced from the second and third phase.

8. The method according to claim 1, wherein the first electrical power is a first two-phase alternating current (AC) signal, and the first load includes a first AC load requiring the first two-phase AC signal for operation of the first load, and wherein the second electrical power is a second two-phase AC signal, and the second load includes a second AC load requiring the second two-phase AC signal for operation of the second load.

9. A method comprising:
converting electrical power of a first phase and a second phase of output from a three-phase inverter to a first direct current (DC) signal, the first DC signal being supplied to a first true DC load of a vehicle, the first true DC load requiring the first DC signal for operation of the first true DC load;
converting electrical power of a third phase and the second phase of the output from the three-phase inverter to a second DC signal, the second DC signal being supplied to a second true DC load of the vehicle, the second true DC load requiring the second DC signal for operation of the second true DC load, the second true DC load being separate and distinct from the first true DC load; and
independently controlling the first phase and the third phase of the output from the three-phase inverter to comply with one or more electrical requirements of at least one of the first true DC load or the second true DC load.

10. A system comprising:
a three-phase inverter configured to supply first electrical power from a first phase and a second phase of output from the three-phase inverter to a first load of a vehicle and to supply second electrical power from the second phase and a third phase of the output from the three-phase inverter to a separate and distinct second load of the vehicle; and
a controller configured to control the first phase and the third phase of the output of the three-phase inverter to comply with one or more electrical requirements of at least one of the first load or the second load.

11. The system according to claim 10, further comprising a first transformer connected between the inverter and the first load and a second transformer connected between the inverter and the second load, wherein each transformer is configured to provide at least one of a designated voltage or a designated current to the first load or the second load, respectively.

12. The system according to claim 10, further comprising a first rectifier connected between the inverter and the first load and a second rectifier connected between the inverter and the second load, wherein each of the first and second rectifiers is configured to convert the first and second electrical power, respectively, from alternating current to direct current.

13. The system according to claim 10, wherein the controller is further configured to control at least one of a leading edge or a trailing edge of one or more of the first phase or the third phase.

14. The system according to claim 10, wherein the controller is further configured to control the second phase to comply with one or more electrical requirements of at least one of the first load or the second load.

15. The system according to claim 10, wherein the first electrical power is a first direct current (DC) signal produced from the first phase and second phase, the first load including a first true DC load requiring the first DC signal for operation of the first load, and wherein the second electrical power is a second DC signal produced from the second phase and the third phase, the second load including a second true DC load requiring the second DC signal for operation of the second load.

16. The system according to claim 10, wherein the first electrical power is a two-phase alternating current (AC) signal and the first load includes an AC load requiring the two-phase AC signal for operation of the first load, and wherein the second electrical power is a direct current (DC) signal and the second load includes a true DC load requiring the DC signal for operation of the second load, the DC signal being produced from the second and third phase.

17. The system according to claim 10, wherein the first electrical power is a first two-phase alternating current (AC) signal, and the first load includes a first AC load requiring the first two-phase AC signal for operation of the first load, and wherein the second electrical power is a second two-phase AC signal, and the second load includes a second AC load requiring the second two-phase AC signal for operation of the second load.

18. A system comprising:
a three phase inverter configured to output a first phase, a second phase, and a third phase of electric current; and
a controller configured to control when each of the first phase and the third phase is supplied from the inverter to first and second loads of a vehicle such that the first phase and the second phase are provided to the first load to power the first load and the second phase and the third phase are provided to the second load to power the second load, the first load being a separate and distinct from the second load.

19. The system of claim 18, wherein the controller is configured to control when the first and third phases are supplied to the first and second loads in order to prevent the third phase from being supplied to the first load and to prevent the first phase from being supplied to the third load.

20. The system of claim 18, wherein the first and second loads are separate loads having one or more different electrical requirements.

21. The system of claim 18, wherein the controller is configured to concurrently distribute the first, second, and third phases among the first and second loads to separately power the first and second loads with different electric currents, the electric current that powers the first load formed from the first and second phases, the electric current that powers the second load formed from the second and third phases.

22. The system of claim 18, wherein the controller is configured to supply each of the first and third phases to the first and second loads, respectively, over different time periods.

* * * * *